United States Patent [19]

Keen

[11] Patent Number: 4,565,397
[45] Date of Patent: Jan. 21, 1986

[54] HAND-GRIPPABLE CARRIER FOR TRANSPORTING CONTAINERS

[76] Inventor: Walter L. Keen, Rte. 1 - Box 80-27, Tolleson, Ariz. 85353

[21] Appl. No.: 649,269

[22] Filed: Sep. 10, 1984

[51] Int. Cl.⁴ .................... A47L 23/28; A47J 45/00
[52] U.S. Cl. ............................... 294/34; 294/27.1; 294/31.2
[58] Field of Search .............. 294/27 H, 27 R, 28, 294/31.2, 34, 15, 137, 165, 146, 141, 142, 143, 166, 167, 168, 169; 215/100 A; 16/114 R

[56] References Cited

U.S. PATENT DOCUMENTS

| | | | |
|---|---|---|---|
| 1,308,742 | 7/1919 | Sutherland | 294/34 |
| 1,593,263 | 7/1926 | Jaworski | 294/34 |
| 1,691,254 | 11/1928 | Robinson | 294/34 |
| 1,913,230 | 6/1933 | Carlson | 294/28 |
| 1,970,247 | 8/1934 | Oxley | 215/100 |
| 2,212,527 | 8/1940 | Morgillo | 294/34 |
| 3,275,366 | 9/1966 | Hidding | 294/31.2 |
| 3,520,570 | 7/1970 | Christopher et al. | 294/27 |
| 4,236,743 | 12/1980 | Fox | 294/27 |

Primary Examiner—James B. Marbert
Attorney, Agent, or Firm—Joseph H. Roediger

[57] ABSTRACT

A hand-held carrier for containers which encircles a portion of the container and is maintained in place by the weight of the container. The handle is rotatably affixed to the encircling means to provide ready engagement and disengagement of the carrier.

10 Claims, 4 Drawing Figures

HAND-GRIPPABLE CARRIER FOR TRANSPORTING CONTAINERS

BACKGROUND OF THE INVENTION

This invention relates to apparatus for facilitating the transport of containers from place to place.

The increasing interest in having commercially-treated water available for use in both home and office dispensers has resulted in the expansion of delivery services for large water containers. Typically, large trucks are designed to accommodate a multiplicity of glass five or ten gallon water containers. The delivery man is required to transport these filled containers to the dispenser sites. The containers themselves are typically not provided with means to grasp them for transport. To facilitate transport of the containers, several different types of carriers have been proposed. One such carrier utilizes U-shaped prongs and is placed around the neck of the container. When raised, the prongs engage the lip or flange of the container opener. This carrier requires substantial strength on the part of the user to maintain the attitude of the carrier such that it remains about the neck of the article being transported. Failure to do so results in a dropping of the container due to the reliance upon an open-ended pair of prongs.

Alternative types of carriers have been used with lighter, smaller containers. These carriers typically employ interconnected wire segments which are placed about the neck of the container by hand. The user is required to orient these different wire segments prior to lifting the container. While the wire holders have insufficient strength to support relatively large water containers, more importantly the placement of the segmented carriers requires a number of steps to manipulate and place the segments properly prior to transport. As a result, both hands of the user are occupied with the task at the beginning and end of container transportation. This process is time-consuming, cumbersome and greatly increases the delivery time when more than one container is involved.

Accordingly, it is a primary objective of the present invention to provide a durable carrier for transporting large containers which encircles a portion of the article being transported so that inadvertent movement out of the hold of the carrier is prevented. Furthermore, the present invention provides a simplified securing mechanism relying on the weight of the container to insure a positive grasping thereof. Further, a quick release is provided as the article is placed upon a support surface. Consequently, the carrier is capable of being used in either hand and does not require the user to utilize a second hand to free the container. Another objective is to provide a carrier which is capable of transporting relatively heavy water containers of the type now being utilized for processed water deliveries.

SUMMARY OF THE INVENTION

The present invention relates to a carrier for transporting a container and includes first and second arcuate encircling means for removably contacting a region of the container when drawn together. In use, the encircling means when so drawn together grasp the neck of the container below the flanges adjacent the opening.

An extension means is mounted on the ends of one of the encircling means with guide means being mounted on the other of the encircling means. The extension means are slidably received in the guide means so that the first and second encircling means can be drawn together and moved apart while still remaining substantially coplanar.

A handle is rotatably coupled to the first arcuate encircling means along with a supporting means also rotatably coupled to the handle and extending outwardly therefrom. The supporting means has first and second ends with the first end being attached to the handle. Further, means are provided for coupling the second end of the supporting means and the second encircling means so that movement of the handle results in a relative movement between the first and second encircling means. As a result the encircling means grasp the container in response to movement of the handle and provide the engagement and disengagement operations of the carrier without requiring the use of the users second or free hand. Further features and advantages of the invention will become more readily apparent from the following description of the preferred embodiment of the invention when viewed in conjunction with the accompanying drawings.

DESCRIPTION OF THE PREFERRED EMBODIMENT

Figure 1:
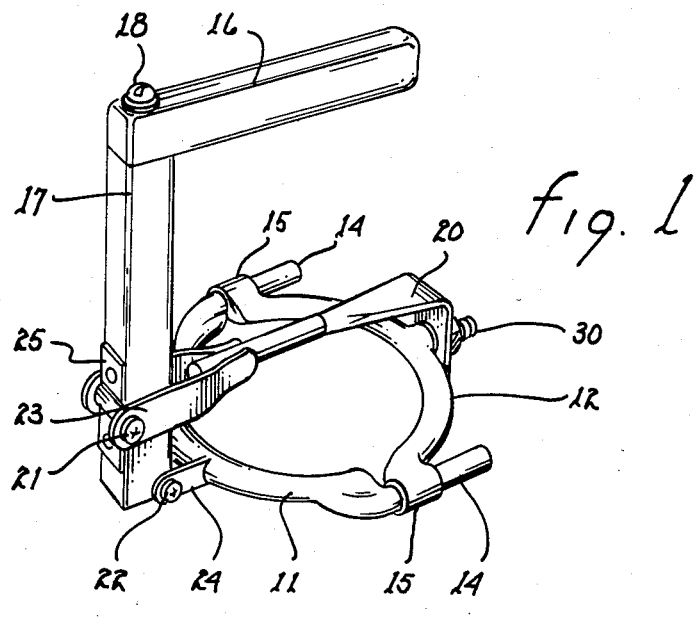
FIG. 1 is a perspective view of one embodiment of the invention.
Figure 2:
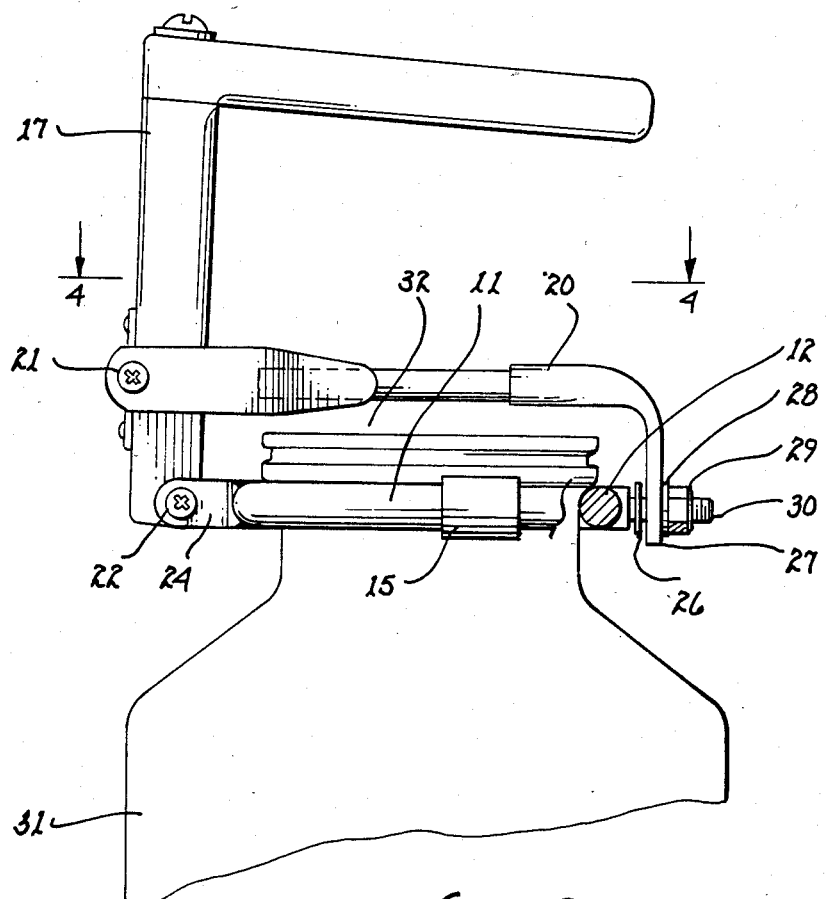
FIG. 2 is a side view of the embodiment of FIG. 1 showing the carrier in position to transport a container.

Referring now to FIG. 1, the embodiment of the carrier for containers is shown in the position utilized to transport a container. The side view of FIG. 2 shows the carrier in position on a typical container. The portions of the carrier which contact and support the container during transport are the inner peripheral portions of first and second arcuate encircling means 11 and 12 respectively. When drawn together, the encircling means bound a circular aperture therebetween which surrounds the container below its necked opening.

The first encircling means 11 includes extension means 14 provided at the ends of the arc. The extension means are linear in that they extend outwardly from the arc in a tangential manner. The second encircling means is provided with guide means 15 in the form of sleeves located at the ends of the arc formed thereby. The sleeves slidably receive the linear extensions 14 to permit supported and controlled relative movement therebetween. In operation, each of the guide means travels along the corresponding linear extension means so that the circle formed by the encircling means 14 and 15 expands and contracts as desired.

A handle 17 including hand-grippable portion 16 fastened thereto by threaded fastener 18 is attached to the outer center peripheral portion of the first encircling means 11 by means of flanges 24 and fastening means 22. The fastening means 22 extends through the inner base of the handle 17 and defines a first axis of rotation between the handle and the first encircling means 11. A supporting means 20 extends between the handle 17 and the outer peripheral portion of the second encircling means 12. The first end of the supporting means 20 is attached to the opposing or rear surface of handle 17 by fastener 21 and securing plate 25. The securing plate is fastened to the handle by threaded fasteners or in the case of a metal handle assembly, by welding. The fastener 21 defines a second axis of rotation governing relative movement between supporting means 20 and handle 17. The second end of the supporting means is attached to the outer peripheral portion of second encircling means 12 by placement over threaded extension 30. As shown in FIGS. 1 and 2, the second end of the supporting means is provided with a downwardly extending flange 27 through which threaded member 30 extends.

Turning to FIG. 2, the flange 27 at the second end of supporting means 20 is bounded by washers 26 and 28 on either side thereof. A threaded fastener 29 is rotated in position on threaded extension 30. It should be noted that second end 27 is loosely fitted to threaded extension 30. This is highlighted by the gaps on either side of washer 26, as shown, along with the use of a hole in the flange which is larger in diameter than the diameter of extension 30. FIG. 2 shows the carrier in position to transport a water container with the first and second encircling means forming a circle about the neck of the container below its flanged opening 32.

Figure 4:
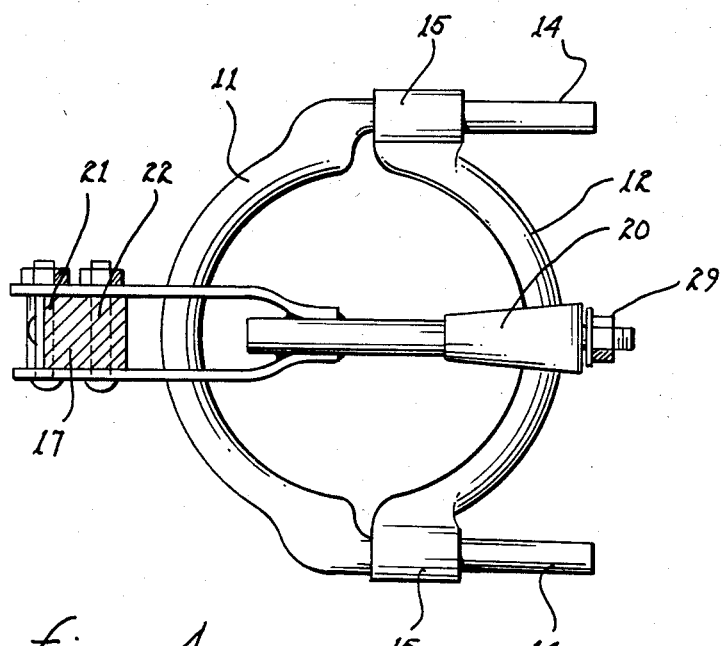
FIG. 4 is a top view of the embodiment shown in FIG. 2 when viewed along lines 4—4.

The top view of FIG. 4 taken along lines 4—4 of FIG. 2 shows the circle formed by the first and second encircling means 11 and 12 respectively when the linear extension means 14 are urged through the guides 15 to draw the encircling means together. As shown, the inner peripheral portions of the encircling means 11 and 12 define a circle. This circle is of lesser diameter than the outer diameter of the flanges about the opening of the container 31 of FIG. 2. The carrier can accommodate containers of different neck size which are larger in diameter than the minimum diameter of the encircling means when drawn together. Also, it is to be noted that the rotational axes 21 and 22 are shown laterally spaced in the cross sectional view of the handle 17 in the preferred embodiment.

The transport position of the carrier is shown in position on container 31 in FIG. 2. The upward force on the hand-grippable portion of 16 of handle 17 is translated into forces urging the guides 15 to the inner limits of extensions 14 thereby urging the encircling means to define the smallest circumference opening. The weight of the container during transport insures that a positive force continues to urge the encircling means together and thereby prevent inadvertent dislodging of the container from the carrier.

Figure 3:
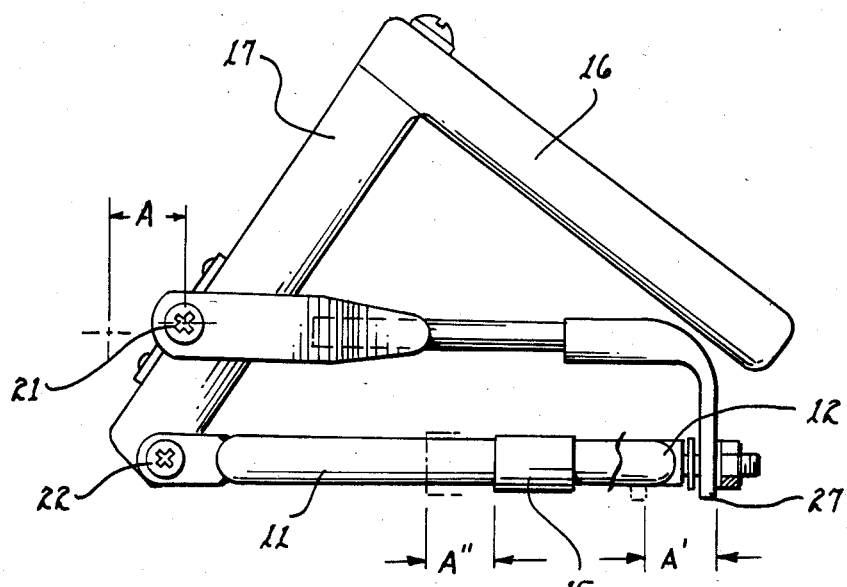
FIG. 3 is a side view of the embodiment of FIG. 1 showing the carrier to be in the disengaging position.

As the container is delivered to its position at the point of final placement, the user lowers the carrier and container therein so that the container contacts and rests upon the surface thereby reducing the forces urging the encircling means closed. The exertion of a small amount of downward pressure on the hand-grippable portion 17 results in the relative movement of the handle supporting arm and encircling means as shown in FIG. 3. Considering the axis of rotation 22 between the handle and the first encircling means 11 to be the reference axis, the movement of the handle 17 results in the movement of the second axis of rotation on the handle by a distance shown as A in FIG. 3. The force generated by the movement of handle 17 is translated into a movement of the second end of the supporting arm 20 by a distance A'. This distance A' represents the outward movement of the second encircling means 12 in relation to the first encircling means 11. Consequently, the extension 14 is shown in a constant position but the sleeve of guide means 15 travels thereon by a distance shown as A". This results in an opening of the area bounded by the first and second encirling means to permit rapid single-handed removal of the carrier from the container being transported.

The ability to rapidly, and with relatively little force, decouple the carrier from a container permits a delivery man to simultaneously utilize a carrier in each hand. The engagement and disengagement of the carrier from the container does not require the placement or orientation of parts of the carrier upon the container with one hand while exerting forces with the second hand. The entire operation of each of these carriers can be conducted by the hand grasping only the hand-grippable portion 16 of the carrier. Although the handle 17 of the embodiment shown comprises several pieces, it is convenient in certain circumstances to make an integral handle thereby omitting fastening means 18 and providing second axis 21 within the handle itself. This embodiment eliminates the securing plate 25 but does not alter the operation of the carrier.

As previously mentioned, the second end of the supporting means 20 makes a loose fit with the threaded extension 30 attached to the outer peripheral portion of the second encircling means 12. The loose fit permits the relative movement of the supporting arm without creating undue strain on the combination of extension means and guide means. This aspect of the invention can be noted from FIG. 3 wherein the movement of the second axes 21 with respect to its former position, shown by the phantom lines, is in a slightly arcuate or curved path as opposed to a straight line movement parallel to the plane containing the first and second encircling means 11 and 12. The departure from straight line movement of the second axis of rotation can also be accommodated by providing resilient means between threaded fastener 29 and the outer peripheral portion of the second encircling means 12. However, it has been found that for increased durability the use of an all-metal embodiment with a loose fit is preferred.

While the foregoing description has referred to a specific embodiment of the invention, it will be recognized that many variations and modifications may be made therein without departing from the scope of the invention as claimed.

What is claimed is:

1. A carrier for transporting a container comprising:
 (a) first and second arcuate encircling means removably contacting a region of said container when drawn together, each of said encircling means having opposing ends;
 (b) linear extension means mounted on the opposing ends of one of the encircling means;
 (c) guide means mounted on the opposing ends of the other of the encircling means for slidably receiving the linear extension means therein, said guide means comprising a sleeve surrounding said linear extension means, said encircling means, extension means and guide means substantially residing within the same plane during relative movement of said first and second encircling means;
 (d) a handle rotatably coupled to said first arcuate encircling means;
 (e) a supporting means having first and second ends, said first end being rotatably coupled to said handle and extending outwardly therefrom; and (f) means for coupling the second end of the supporting means and the second encircling means, the movement of said handle providing relative movement between said first and second encircling means for removably contacting a region of the container being transported.

2. The carrier of claim 1 wherein said handle comprises a handle-grippable portion and a load-bearing arm depending therefrom, said first encircling means being rotatably coupled in a first region proximate to the end of the load-bearing arm.

3. The carrier of claim 2 wherein the first end of said supporting means is rotatably coupled to the loadbearing arm at a second region spaced above the first region of coupling to the first encircling means.

4. The carrier of claim 1 wherein said means for coupling the second end of the supporting means and the second encircling means provides a loose coupling therebetween to permit relative movement therebetween as the first and second encircling means are drawn together.

5. The carrier of claim 4 wherein the supporting means comprises a rigid support arm extending outwardly from the handle above the second encircling means and a depending arm extending downwardly to said means for coupling to the second encircling means.

6. The carrier of claim 5 wherein said handle comprises a handle-grippable portion and a load-bearing arm depending therefrom, said first encircling means being rotatably coupled in a first region proximate to the end of the load-bearing arm.

7. The carrier of claim 6 wherein the support arm is rotatably coupled to the load-bearing arm at a second region spaced above the first region of coupling to the first encircling means.

8. The carrier of claim 7 wherein said load-bearing arm is provided with inner and outer edges with respect to said first encircling means, said first encircling means being coupled to said arm in a first region proximate to the inner edge thereof, said support arm being coupled to said arm in a second region which is above and outwardly displaced from said first region.

9. A carrier for transporting a container comprising:
(a) first and second coplanar semicircular members for removably contacting a region of said container when drawn together; each of said members having a pair of diametrically opposed ends;
(b) linear extension means mounted on the ends of one of the semicircular members;
(c) sleeve means mounted on the ends of the other of said semicircular members for slidably receiving said extension means therein, the semicircular members extension means and sleeve means substantially within the same plane during relative movement of said first and second members;
(d) a handle coupled to said first member for rotation about a first axis;
(e) supporting means having first and second ends, said first end being coupled to said handle for rotation about a second axis, said supporting means extending outwardly from the handle and spaced from the semicircular members; and
(f) means for coupling the second end of the supporting means and the second semicircular member, the rotation of said handle about said first axis providing relative movement between said first and second members for removably contacting a region of the container being transported.

10. The carrier of claim 9 wherein said first and second axes are parallel.

* * * * *